Patented Apr. 15, 1941

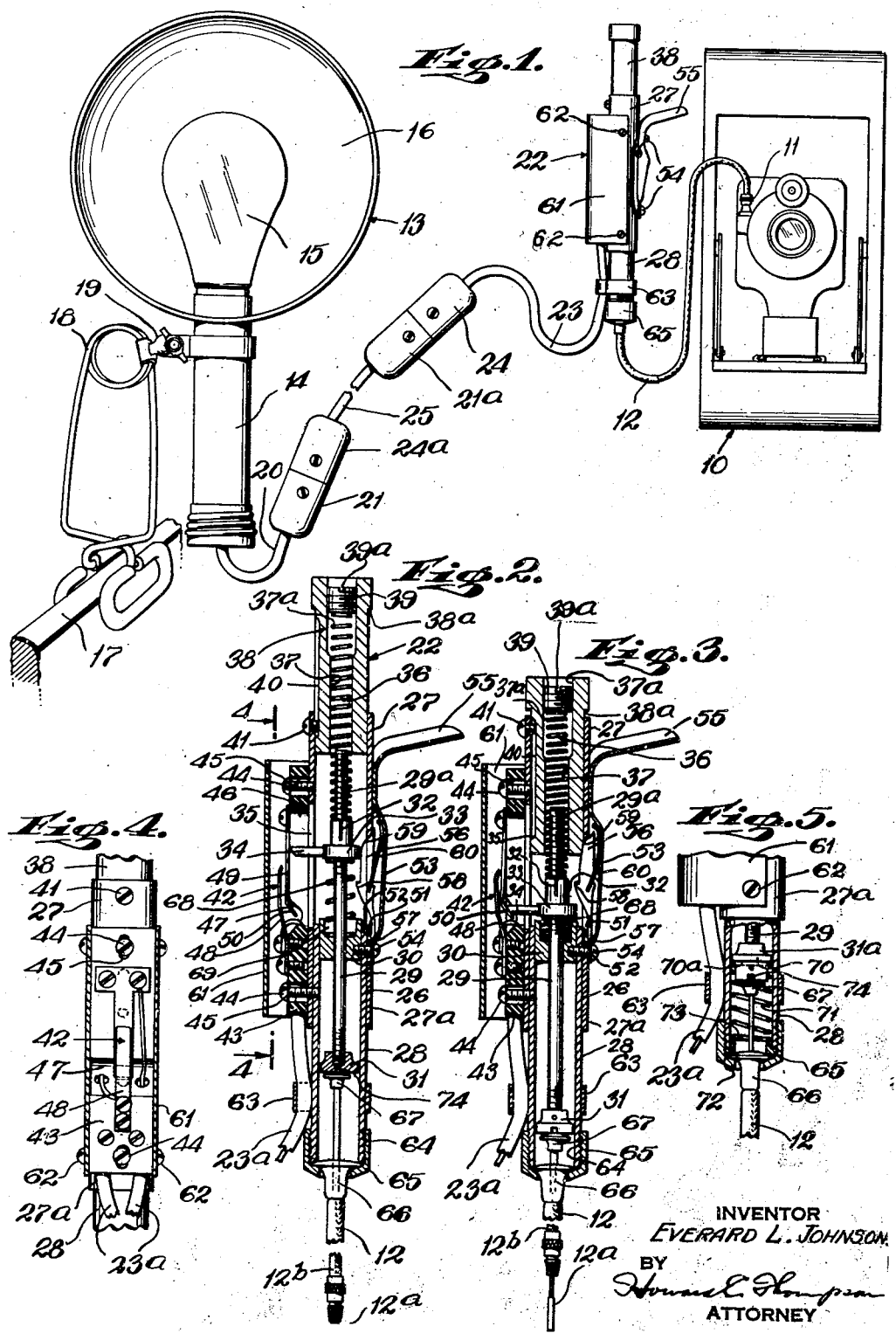

2,238,115

UNITED STATES PATENT OFFICE 2,238,115

FLASHLIGHT OPERATING DEVICE

Everard L. Johnson, Patchogue, N. Y., assignor of one-third to Herman J. Schoenfeld, Patchogue, N. Y.

Application August 4, 1938, Serial No. 223,026

11 Claims. (Cl. 67—29)

This invention relates to flashlight operation devices for cameras and particularly to an operating unit involving a flash actuating mechanism as an integral part of said unit and means for detachably coupling a shutter release therewith; a further object being to provide a control unit of the class described having means for adjusting the flash and shutter release to synchronize the operation thereof with respect to each other and with respect to the particular camera in connection with which the device is used; a still further object being to provide means for imparting to said flash and shutter release an instantaneous or trigger-like movement into operative position; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a diagrammatic view illustrating the general arrangement of a flashlight device and a camera with one of my improved control devices associated therewith.

Fig. 2 is a longitudinal sectional view of my device with the parts thereof arranged in the normal or inoperative position.

Fig. 3 is a view similar to Fig. 2, showing the parts in operative position.

Fig. 4 is a section on the line 4—4 of Fig. 2; and,

Fig. 5 is an enlarged sectional view of the lower part of the device shown in Figs. 2 and 3, including a slight modification.

In Fig. 1 of the drawing I have diagrammatically illustrated at 10 a camera having means 11 for detachably coupling a cable type shutter release 12 therewith. I have also shown a suitable flashlight means 13 as including a casing 14, a bulb 15, and a reflector 16. The casing 14 is attached to a suitable support 17 by a conventional spring clamp 18 having a universal adjustable joint 19 therein. The casing 14 is provided with wires 20 having a detachable coupling 21 secured thereto. I have also shown my improved control device 22 arranged in conjunction with the camera 10 and the flashlight means 13. The control device is provided with wires 23 having a detachable coupling 24 adapted to engage the coupling 21 and to complete an electrical circuit through the flashlight means and the control device. Indicated at 25 is an extension wire having detachable couplings 21a and 24a adapted to be inserted between the couplings 21 and 24 to enable the supporting of the flashlight means in a position remote from the camera and the control device.

In Figs. 2 to 4 inclusive for purposes of illustrating one form of my invention, I have shown my control device 22 as comprising an elongated casing 26 open at both ends and including an upper casing 27 and a lower casing 28 extending into the lower end 27a thereof. Arranged within the casing 26 is a longitudinally movable actuating mechanism comprising a rod or shaft 29 slidably mounted in a bushing 30, arranged centrally of the casing 26. The shaft 29 is threaded at one end to receive a head or nut 31 adapted to closely but slidably engage the inner walls of the casing 28.

The other end of the shaft 29 is threaded as at 29a along a considerable portion thereof and an internally threaded sleeve 32 is arranged thereon. The sleeve 32 has a relatively wide flange 33 at one end thereof and an elongated projection 34 forming a switch actuating element extending from one side of the flange 33 and through an aperture 35 in the upper casing 27. A coil spring 36 is arranged about the shaft 29 at the end 29a thereof and bearing against the sleeve 32. The spring 36 extends beyond the shaft 29 into a central bore 37 of a plunger 38 slidably arranged in the upper casing 27. The plunger 38 forms the flash actuating member or element of the device. The bore 37 of the plunger 38 is enlarged as at 37a at the upper end thereof and threaded to receive a screw 39. The screw 39 is adapted to adjust the compression in the spring 36 and is provided with a slot 39a in the upper surface thereof whereby a screwdriver may be employed for making such adjustment. The plunger 38 has an external groove 40 registering with a screw 41 in the casing 27 and adapted to limit movement of the plunger outwardly of the casing 27 and at the same time to prevent rotary movement of the plunger. The upper end of the plunger 38 is slightly enlarged forming a shoulder 38a which acts to limit inward movement of the plunger by bearing against the end of the upper casing 27.

Arranged on one side of the casing 26 and in registering alinement with the aperture 35 in the upper casing 27 is an electric switch 42 carried by a mounting member 43. The mounting member is secured to the casing 26 by screws 44 passing through elongated holes 45 in said member. The holes 45 provide for slight adjustment of the position of the mounting member longitudinally of the casing. The mounting member is provided with an elongated aperture 46 registering with the aperture 35 in the upper casing 27 and the outer surface of the mounting member is provided with a transverse groove or recess 47 registering with the lower end of the aperture 46.

The switch proper comprises a spring contact arm 48 secured to the mounting member adjacent the transverse recess 47 and a second spring contact arm 49 secured to the mounting member at the opposed end of the aperture 46. The end 50 of the arm 49 is curved or bent inwardly to fall in the path of the projection 34 as it moves longitudinally of the apertures 35 and 46. The spring arms 48 and 49 are connected by suitable contacts to the electric wires 23a which lead to the flashlight means as diagrammatically illustrated in Fig. 1 and form a complete electrical circuit. The circuit is closed or operative when the spring contact arms 48 and 49 are brought into contact by the action of the projection 34 on the inturned end 50 of the spring arm 49.

The opposed side of the upper casing 27 is provided with an elongated aperture 51 and a small aperture or recess 52 adjacent the lower end thereof. An outwardly projecting elongated hood 53 is arranged over the apertures 51 and 52 and is secured to the casing 26 by suitable means as indicated by the screws 54. The hood 53 integrally joins at the upper end thereof an outwardly extending finger piece 55.

Arranged within the aperture 51 is a trigger or trip cam 56 having at the lower end thereof a projection 57 registering with the recess 52 and forming a pivot for said trigger. The trigger 56 has an inward projection 58 in the central portion thereof adapted to engage the flange 33 of the sleeve 32. The upper portion of the trigger 56 has a cam surface 59 extending into the upper casing 27 and into the path of the plunger 38 when the trigger is normally projected into the casing 27 by a spring 60 acting against the inner wall of the hood 53.

The casing 26 of my device is further provided with an elongated hood 61 arranged over the switch 42 and the electric contacts thereof, said hood being secured to the casing by suitable means as indicated by the screws 62. A strap 63 is provided at the lower end of the casing 26 for supporting the wires 23 in connection therewith as is clearly seen in the drawing; and the end of the lower casing 28 is threaded as at 64 to receive an apertured cap 65.

In the operation of the device the cap 65 is removed and a conventional cable release 12 is threaded therethrough and inserted within the lower casing 28 as will clearly be seen in the drawing. The flanged finger piece 66 of the cable release is firmly supported between the end of the lower casing 28 and the cap 65, and the release plunger 67 is engaged by the head 31 of the shaft 29. If the plunger 38 is now moved inwardly in the upper casing 27, the sleeve 32 is brought into contact with the projection 58 on the trigger 56. This projection temporarily retains the sleeve against further movement as the spring 36 is being compressed. When the plunger 38 engages the cam surface 59 of the trigger 56, the trigger is moved outwardly of the casing releasing the sleeve 32. The shaft 29 instantaneously moves downwardly in the casing under the action of the spring 36, and in the downward movement thereof the projection 34 on the sleeve 32 bears against the inwardly extending end 50 of the spring 49 moving it outwardly into engagement with the contact arm 48 to close the electrical circuit. At the same time the head 31 of the shaft 29 moves the plunger 67 of the cable release into operative position, or in other words, projects the cable 12a through the other end of the flexible shaft 12b of the release to engage and operate the shutter of the camera.

When pressure on the plunger 38 is released, the shaft 29 and the parts secured thereto are moved upwardly by the action of the spring 68. The spring 68 is arranged around the shaft 29 seating in a recess 69 in the bushing 30 and contacting the flange 33 of the sleeve 32. It will be apparent that the spring 68 must have sufficient compression strength to move the shaft 29 upwardly over the projection 58 of the trigger 56 and to slightly compress the spring 36. At the same time, however, the spring 68 must not be strong enough to interfere with the downward movement of the shaft 29 under the action of the spring 36 when the latter is compressed. The result is clearly shown in the drawing; Fig. 2 indicating the position of the part supported upwardly by the spring 68, and Fig. 3 showing the parts supported downwardly and the spring 68 compressed under the action of the spring 36.

In Fig. 5 of the drawing, I have shown a modified means for supporting the parts in the position shown in Fig. 2, which means may be used in conjunction with the spring 68 or substituted therefor. In this modification the head 31a of the shaft 29 has a flange 70 forming a bearing surface or shoulder 70a to receive a spring 71. The lower casing 28 is threaded at the lower end thereof to receive an apertured cap 65 as previously described in connection with Fig. 2. A flanged sleeve 72 is preferably inserted in the end of the casing 28 to form a bearing surface 73 for the spring 71. It will be again apparent that the strength of the spring 71 is used alone, or the combined strength of the springs 68 and 71 if the two are used jointly, must not be sufficient to interfere with the downward movement of the parts under the action of the compressed spring 36 since the instantaneous movement of the parts into operative position after the trigger-like release thereof is an important and novel feature of the invention.

It will be apparent that I further provide means for adjusting the device to synchronize the shutter and flash engaging elements thereof in adapting the device for use with any given camera and flash means. In synchronizing the device, a conventional electric light bulb is substituted for the flash means. The back of the camera is open and the bulb is arranged in alinement with the lens. The plunger 38 is then depressed into operative position and if the light can be seen through the lens as the shutter clicks, the device is either properly adjusted or the flash operating means is coming into engagement first. To check the adjustment the cap 65 is removed and the cable release withdrawn from the casing. The screwdriver may then be inserted in the casing and the head 31 of the shaft 29 may be turned by means of the slot 74. This turns the entire shaft and feeds it through the sleeve 32 which is keyed against rotation by the projection 34 and the aperture 35. Rotation of the head and shaft in one direction will cause the cable release to reach operative position earlier while rotation in the other direction will cause it to reach operative position later in the downward movement of the shaft; and by simply rotating the shaft in one direction or the other and re-testing the adjustment of the device, it will be readily seen that the device may be very accurately synchronized insuring a flash at the exact instant the shutter clicks. In extraordinary cases it might become necessary to adjust the position of the flash operating switch; and should this occur the adjustment may be made by merely loosening the screws 44 and sliding the switch support 43 longitudinally of the casing as provided by the elongated apertures 45 in the switch mounting member.

My improved device is very simple and economical in construction and readily adapted for use by amateur as well as professional photographers. The trigger-like action of the device makes possible the snapping of pictures at the exact instant desired and at the same time operates as a synchronizing or timing means for the flash and shutter operating elements. The adjustable synchronizing means provided are especially advantageous when the device is to be used in connection with a very high speed camera in which event the timing of the shutter and flash operating means must be exact.

It will be understood at this time that my flash and shutter operating device may be used in conjunction with any type shutter actuating means for cameras. It will also be apparent that my synchronizing and control device may be used with any dual control systems in which it is desired to simultaneously move the control elements into operative position.

It will be further understood that my improved trigger like switch actuating means may be used in electrical circuits of any kind or class and especially where an instantaneous movement of the switch into closed position is desired.

Having fully described my invention, what I claim as new and desire to secure by Letters Patent is:

1. In a flashlight actuating device for cameras providing synchronized operation of the flash bulb with the shutter operation of the camera, said device comprising a casing, a normally open switch in the casing controlling the actuation of a flash bulb, a shutter operating element detachably coupled with and extending freely into one end of the casing, a pushable plunger movable in the other end of the casing, a member movably supported in the casing between said plunger and element, said member having relatively adjustable parts for directly actuating said switch and shutter operating element, means involving a spring for yieldably coupling the plunger with said member for actuating said member in the operation of said plunger, and means directly engaging said member to provide a quick trigger-like release thereof in the actuation of said member to simultaneously close the switch and actuate the shutter controlled by said element.

2. In a flashlight actuating device for cameras providing synchronized operation of the flash bulb with the shutter operation of the camera, said device comprising a casing, a normally open switch in the casing controlling the actuation of a flash bulb, a shutter operating element detachably coupled with and extending freely into one end of the casing, a pushable plunger movable in the other end of the casing, a member movably supported in the casing between said plunger and element, said member having relatively adjustable parts for directly actuating said switch and shutter operating element, means involving a spring for yieldably coupling the plunger with said member for actuating said member in the operation of said plunger, means directly engaging said member to provide a quick trigger-like release thereof in the actuation of said member to simultaneously close the switch and actuate the shutter controlled by said element, said last named means comprising a trigger pawl directly engaging said member, and means on the pawl engaged by said plunger for releasing the same from said member.

3. In a flashlight actuating device for cameras providing synchronized operation of the flash bulb with the shutter operation of the camera, said device comprising a casing, a normally open switch in the casing controlling the actuation of a flash bulb, a shutter operating element detachably coupled with and extending freely into one end of the casing, a pushable plunger movable in the other end of the casing, a member movably supported in the casing between said plunger and element, said member having relatively adjustable parts for directly actuating said switch and shutter operating element, means involving a spring for yieldably coupling the plunger with said member for actuating said member in the operation of said plunger, means directly engaging said member to provide a quick trigger-like release thereof in the actuation of said member to simultaneously close the switch and actuate the shutter controlled by said element, said last named means comprising a trigger pawl directly engaging said member, means on the pawl engaged by said plunger for releasing the same from said member, means including the first named spring for moving the plunger into extended position and for supporting said member in inoperative position, and means adjusting the tension of the first named spring.

4. In a flashlight actuating device for cameras providing synchronized operation of the flash bulb with the shutter operation of the camera, said device comprising a casing, a normally open switch in the casing controlling the actuation of a flash bulb, a shutter operating element detachably coupled with and extending freely into one end of the casing, a pushable plunger movable in the other end of the casing, a member movably supported in the casing between said plunger and element, said member having relatively adjustable parts for directly actuating said switch and shutter operating element, means involving a spring for yieldably coupling the plunger with said member for actuating said member in the operation of said plunger, means directly engaging said member to provide a quick trigger-like release thereof in the actuation of said member to simultaneously close the switch and actuate the shutter controlled by said element, one part of said member comprising a sleeve adjustable longitudinally of the member, and the other part comprising a screw-head accessible through the first named end of the casing for adjusting the position of said sleeve with respect to said head.

5. A flash and shutter operating device for cameras, said device comprising an elongated casing, flash means, a normally open switch on the casing with means for placing said switch in circuit with said flash means, a flash and shutter operating rod arranged within said casing and movable longitudinally thereof, a plunger movably supported in one end of said casing, a coil spring disposed between said plunger and rod, a shutter actuating element detachably coupled at the other end of said casing and in engagement with said operating rod, a switch actuating member arranged on and adjustable longitudinally of said rod to synchronize the operation of said shutter and flash means, means supporting said rod to resist compression of said spring by said plunger, and said plunger tripping said last named means to release said rod to provide substantially instantaneous operation of said flash and shutter by said rod.

6. A device of the class described comprising an elongated casing, a rod arranged in and movable longitudinally of the casing, a plunger normally projecting through one end of the casing and in operative engagement with and movable independently of said rod, means for detachably coupling a shutter actuating element with the other end of the casing, said element extending into the casing and in operative engagement with said rod, a finger piece for supporting the casing in the hand to provide thumb actuation of said plunger, a switch device on said casing consisting of normally spaced spring contacts, means adjustably supported on said rod for engaging one of the contacts to move the same into engagement with the other contact in completing the circuit therethrough simultaneously with the operating of the shutter operating element by said rod, rod releasing means normally supporting the adjustable means thereof out of engagement with said contact and tripped by said plunger in providing synchronized operation of said switch and element, and a coil spring between said plunger and rod normally extending the plunger and compressed in manually pushing the plunger into the casing to store the energy which operates the rod upon the retraction of said rod releasing means by said plunger.

7. A flashlight operating device for cameras comprising an elongated casing, a normally open switch on said casing with means for placing said switch in circuit with a flashing means, a camera shutter operating element detachable at one end of the casing, a pushable plunger supported in the other end of the casing, a spring constantly maintaining the plunger, when not pushed, in extended position, a shaft within the casing, a switch actuating part adjustable on the shaft, said shaft engaging said element and the spring actuating said plunger, and means supporting the shaft and part thereof in inoperative position, said means being tripped by the plunger upon compression of said spring by the plunger whereby upon the release of said last named means sudden movement is imparted to said shaft and part to provide synchronized operation of the flashing means and camera shutter through said switch and element.

8. A flash and shutter operating device for cameras comprising an elongated cylindrical casing, a switch arranged outwardly of one side of the casing and registering with an elongated opening formed in said casing, a switch operating rod movable longitudinally of the casing and having an adjustable part protruding through the aperture thereof for engagement with said switch, a plunger extending into the casing and normally protruding through one end thereof, a coil spring disposed between the plunger and said rod through which the rod is moved into operative position, means supporting the rod against the action of the plunger and spring, a shutter operating element in operative engagement with said rod, and said plunger engaging the last named means at a predetermined inward movement of the plunger in the casing to release said rod in providing simultaneous operation of the switch and element.

9. A flash and shutter operating device for cameras comprising an elongated cylindrical casing, a switch arranged outwardly of one side of the casing and registering with an elongated opening formed in said casing, a switch operating rod movable longitudinally of the casing and having an adjustable part protruding through the aperture thereof for engagement with said switch, a plunger extending into the casing and normally protruding through one end thereof, a coil spring disposed between the plunger and said rod through which the rod is moved into operative position, means supporting the rod against the action of the plunger and spring, a shutter operating element in operative engagement with said rod, said plunger engaging the last named means at a predetermined inward movement of the plunger in the casing to release said rod in providing simultaneous operation of the switch and element, and said switch comprising independent adjustable contacts.

10. A flashlight actuating device for cameras providing synchronized operation of the flash bulb with the shutter operation of the camera, a casing having means for completing a circuit to the flash bulb and an element for actuating a camera shutter, adjustable means on said element providing synchronized operation of the first named means and element, a pushable plunger in said casing, a coil spring between the plunger and the second named means normally extending the plunger from the casing, and latch means providing free movement of the plunger into the casing against the action of said spring to compress the same while maintaining the second named means in inoperative position and to suddenly release the second named means when said latch means is tripped by direct engagement of the plunger therewith in simultaneously actuating the first named means and said element.

11. A flashlight actuating device for cameras providing synchronized operation of the flash bulb with the shutter operation of the camera, a casing having means for completing a circuit to the flash bulb and an element for actuating a camera shutter, adjustable means on said element providing synchronized operation of the first named means and element, a pushable plunger in said casing, a coil spring between the plunger and the second named means normally extending the plunger from the casing, latch means providing free movement of the plunger into the casing against the action of said spring to compress the same while maintaining the second named means in inoperative position and to suddenly release the second named means when said latch means is tripped by direct engagement of the plunger therewith in simultaneously actuating the first named means and said element, and means adjusting the position of the first named means with respect to said second named means.

EVERARD L. JOHNSON.